Sept. 22, 1942.   R. D. LACOE   2,296,528
AIRPLANE STALL INDICATING APPARATUS
Filed May 20, 1940   2 Sheets-Sheet 1
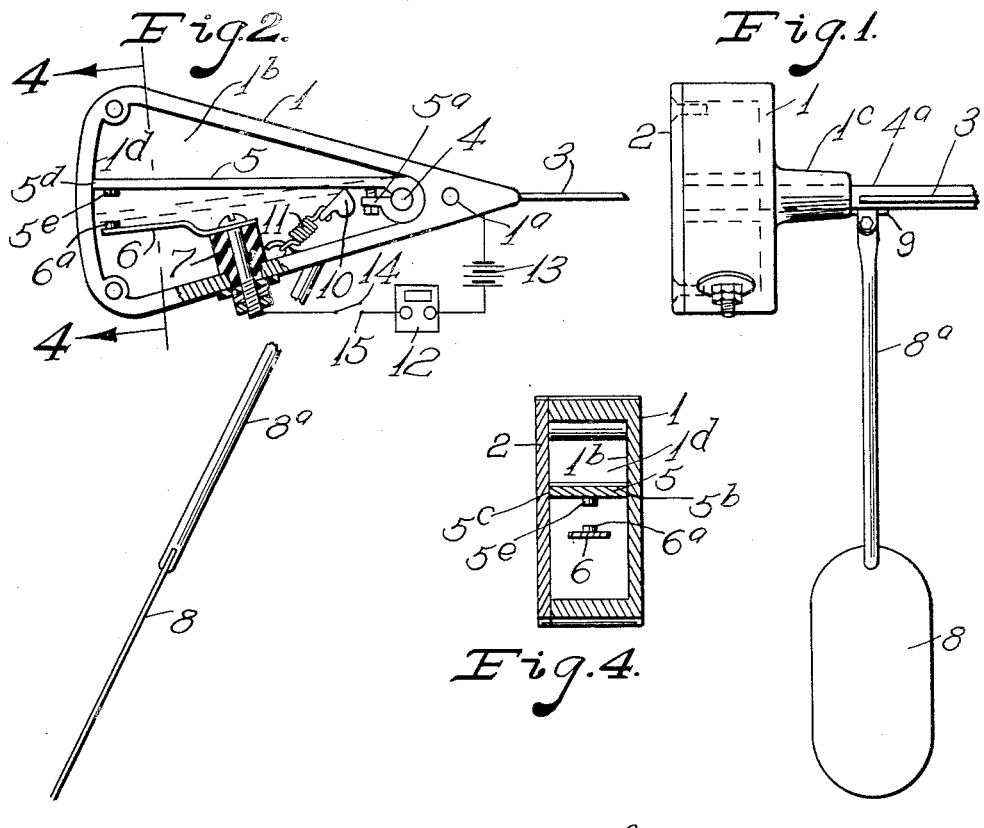
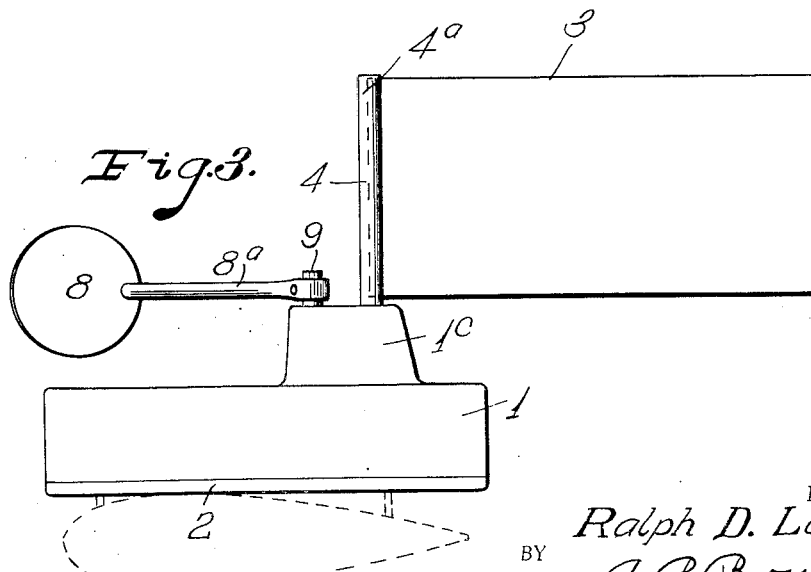
INVENTOR.
Ralph D. Lacoe
BY A. B. Bowman
ATTORNEY.

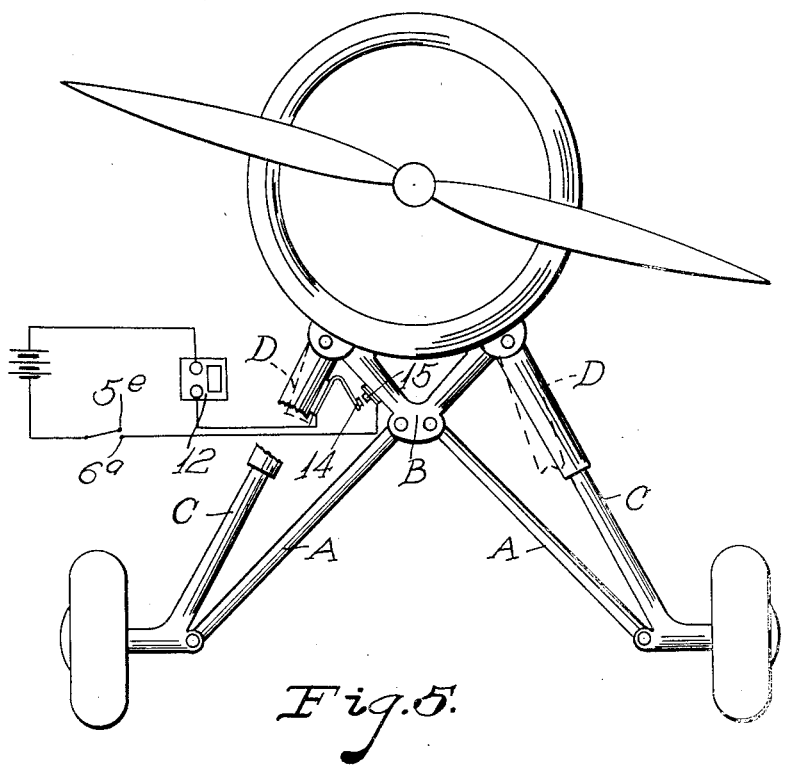

Patented Sept. 22, 1942

2,296,528

UNITED STATES PATENT OFFICE 2,296,528

AIRPLANE STALL INDICATING APPARATUS

Ralph D. Lacoe, San Diego, Calif.

Application May 20, 1940, Serial No. 336,133

7 Claims. (Cl. 200—81)

My invention relates to an airplane stall indicating apparatus, more particularly to an apparatus for indicating to and warning a pilot of the approach of a stall at a predetermined angle of incidence or predetermined slow down of the airplane before the stalling point is reached, and the objects of my invention are:

First, to provide an apparatus of this class which will provide a definite indication or warning to the airplane pilot of the approach of the angle or stall of the airplane in time to correct the same;

Second, to provide an apparatus of this class which operates an electric warning indicator which may be positioned in close proximity to the pilot;

Third, to provide an apparatus of this class in which the indicator does not operate until the airplane approaches flying speed, but provides a signal when the airplane is in flight and the angle of incidence changes to a predetermined point;

Fourth, to provide an apparatus of this class which may be positioned in various positions on the airplane which are found to be the most effective and the operating power conducted to any position desired in close proximity to the pilot;

Fifth, to provide a device of this class which is easily streamlined so as to reduce to a minimum the air friction in connection with the apparatus and in which the exterior air vane is substantially balanced;

Sixth, to provide an apparatus of this class which has but small inertia, yet is not subject to detrimental vibration;

Seventh, to provide an apparatus of this class which will provide an adequate warning for the pilot independent of the variations of air speed or variations of the airplane load in time to prevent the airplane reaching the stalling point;

Eighth, to provide an apparatus of this class which is easily adaptable and adjustable for the various types of airplanes;

Ninth, to provide an apparatus of this class in which the electrical contacts will not readily get out of adjustment and will not arc or burn or show appreciable wear;

Tenth, to provide an apparatus of this class in which the electrical contacts are not affected adversely by vibration; and Eleventh, to provide an apparatus of this class which is very simple and economical, durable, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary rear end elevational view of my airplane stall indicating apparatus; Fig. 2 is a fragmentary side view thereof showing the cap removed and showing certain parts and portions in section to facilitate the illustration and also showing the electrical parts of the apparatus diagrammatically; Fig. 3 is a top or plan view of my airplane stall indicating apparatus shown mounted in connection with one of the vertical struts of the airplane; Fig. 4 is a sectional view taken from the line 4—4 of Fig. 2 and Fig. 5 is a fragmentary front elevational view of an airplane showing an electrical switch of my airplane stall indicating apparatus in connection with the landing gear of the airplane and showing by dash lines a varying position of the landing gear of the airplane.

Similar characters of reference refer to similar parts and portions throughout the several views of the drawings:

The casing member 1, casing cap 2, main air vane 3, vane shaft 4, damper and contact member 5, spring contact member 6, insulation member 7, secondary air vane 8, secondary air vane shaft 9, cam member 10, spring 11, buzzer 12, battery 13 and electrical contacts 14 and 15 constitute the principal parts and portions of my airplane stall indicating apparatus.

The casing member 1 is substantially streamlined and is provided with a cap 2 which is secured on one side of the casing 1 by means of screws arranged to engage the screw threaded holes 1a in the casing 1. This casing cap 2 is substantially flat and provides a flat smooth surface on its inner side which opposes the flat surface 1b of the inner side of the casing 1, as shown best in Figs. 2 and 4 of the drawings.

The casing 1 is provided with an offset streamlined portion 1c which is journalled the shaft 4, which shaft 4 extends laterally through the casing 1 an its outwardly extending portion 4a is arranged to support the main air vane 3, as shown best in Figs. 1 and 3 of the drawings.

Secured on this shaft 4 internally of the casing member 1 is the damper and contact member 5. This damper and contact member 5 is provided with a clamp portion 5a which is arranged to hold the damper and contact member 5 in secure relation with the shaft 4. The opposite edges 5b and 5c of this damper and contact member 5 are arranged to fit closely to the inner surface 1b of the casing 1 and the inner surface of the casing cap 2, as shown best in Fig. 4 of the drawings. It will be noted that the end portion 5d of this damper and contact member 5 is arranged to shift in close proximity to the inner arcuate surface 1d of the casing member 1, as shown best in Fig. 2 of the drawings. It will be noted that since the edges 5c and 5b and the end 5d are arranged in close fitted relation with the inner sides of the casing 1 and cap 2, that air on either side of the damper and contact member 5 provides a cushioned effect to the action of the damper and contact member 5 as it shifts with the shaft 4 in connection with the main air vane 3. Secured on the lower side of the damper and contact member 5 near its end portion 5d is a contact portion 5e which is arranged to engage the contact portion 6a of the spring contact member 6 which is mounted on the insulation member 7 in the lower side of the casing member 1, as shown best in Fig. 2 of the drawings. It will be noted that this spring contact member 6 is electrically insulated from the casing member 1.

In order to prevent the contact portion 5e from contacting the portion 6a of the spring contact member 6, I have provided a secondary air vane 8 which is supported on the arm 8a extending slightly forwardly and downwardly from one side of the casing 1 and this arm 8a is supported on the shaft 9, as shown best in Fig. 3 of the drawings. This shaft 9 extends inwardly into the casing 1 and integrally secured to the end of this shaft 9 is a cam member 10 which is arranged to engage the under side of the damper and contact member 5. This cam member 10 in connection with the secondary air vane 8, as shown in Fig. 2 of the drawings, prevents the damper and contact member 5 from shifting to the dash line position, as shown in Fig. 2 of the drawings whereby the contact portions 5e and 6a are arranged to engage each other.

The spring 11, as shown in Fig. 2 of the drawings, is a tension spring tending to hold said cam member 10 together with the secondary air vane 8 in the position, as shown in Fig. 2 of the drawings. However, when the airplane is in flight the vane 8 is moved backwardly by air pressure turning the cam 10 against the action of the spring 11 and provides the damper and contact member 5 with clearance so that the contact portions 5e and 6a may be brought together by means of air pressure against the main air vane 3.

It will be noted that when the airplane is in flight and the airplane reaches a certain predetermined inclined angle, the pressure of the air stream is exerted on the lower surface of the main air vane 3, causing the damper and contact member 5 to shift downwardly bringing together the contact portions 5e and 6a closing the circuit to the buzzer 12 and indicating to the pilot the approach of the angle of stall of the airplane.

The electrical contacts 14 and 15 are arranged to be engaged by each other and are mounted on the airplane landing gear, as shown in Fig. 5 of the drawings, the contact 14 being mounted on the shock absorber C and the contact 15 being mounted on the strut B. It will be noted that the shock absorbers C are yieldable and that when the airplane is on the ground, as shown in Fig. 5, the shock absorbers C are in further spaced relation than when in the air and assuming the dash line position D. Therefore the contacts 14 and 15 are disengaged when the airplane is resting on its wheels and are engaged when the airplane is in flight. The strut B is stationary and the shock absorbers C when shifted to the dash line position D by compression of the shock absorbers C after the airplane has ascended cause the contacts 14 and 15 to be forced together in their intermediate relation with the stationary strut B and one of the shock absorbers C providing switch means connecting with and rendering my airplane stall indicating apparatus inoperative when the airplane is on the ground.

It will be here noted that this arrangement causes positive automatic switch control with the landing of the plane whereby the switch 5e, 6a is rendered inoperative by the switch 14, 15 preventing signals being given due to air currents or vibration acted on the cam 10 and the member 5 while the airplane is grounded. It will be further noted that the electrical switch on the landing gear is in direct electrical connection with the electrical switch in connection with the air vane.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an airplane stall indicating apparatus of the class described, a casing, a pivoted contact member shiftably positioned in said casing and enclosed thereby, an air vane connected with the axis of said contact member outwardly of said casing, a cam member in said casing arranged to engage said contact member to limit its movement, and a second air vane outwardly of said casing in cooperative relation with said cam member.

2. In an airplane stall indicating apparatus of the class described, a casing, a pivoted contact member shiftably positioned in said casing and enclosed thereby, an air vane connected with the axis of said contact member outwardly of said casing, a cam member in said casing arranged to engage said contact member to limit its movement, a second air vane outwardly of said casing in cooperative relation with said cam member, and means tending to hold said cam member and said vane in connection therewith in position for limiting the movement of said contact member.

3. In an airplane stall indicating apparatus of the class described, a casing, a pivoted contact member shiftably positioned in said casing and enclosed thereby, an air vane connected with the axis of said contact member outwardly of said casing, a cam member in said casing arranged to engage said contact member to limit its movement, a second air vane outwardly of said casing in cooperative relation with said cam member, means tending to hold said cam member and said vane in connection therewith in position for limiting the movement of said contact member, and an insulated spring contact member positioned in cooperative relation with said contact member.

4. In an airplane stall indicating apparatus of the class described, a casing, a pivoted contact member shiftably positioned in said casing and enclosed thereby, an air vane connected with the axis of said contact member outwardly of said casing, a cam member in said casing arranged to engage said contact member to limit its movement, a second air vane outwardly of said casing in cooperative relation with said cam member, and spring contact means in said casing and insulated therefrom arranged to cooperate with said contact member.

5. In an airplane stall indicating apparatus of the class described, a substantially streamlined hollow casing, a contact member with one end journalled in one end of said casing, an air vane connected with the journalled end of said contact member outwardly of said casing, a cam member in said casing arranged to engage said contact member to limit its movement, and a second air vane outwardly of said casing in operative relation with said cam member.

6. In an airplane stall indicating apparatus of the class described, a substantially streamlined hollow casing, a contact member with one end journalled in one end of said casing, an air vane connected with the journalled end of said contact member outwardly of said casing, a cam member in said casing arranged to engage said contact member to limit its movement, a second air vane outwardly of said casing in operative relation with said cam member, and means tending to hold said cam member and said second air vane in position for limiting the movement of said contact member.

7. In an airplane stall indicating apparatus of the class described, a casing, a contact member journalled in one end of said casing and adjacent the inner sides of said casing at its edges, an air vane connected with the journalled end of said contact member outwardly of said casing, a spring contact member in said casing electrically insulated therefrom in cooperative relation with said contact member, the opposite sides of said contact member arranged for engaging air in said casing for modifying the action of said contact member in said casing, a cam member in said casing arranged to engage said contact member to limit its movement, a second air vane outwardly of said casing in operative relation with said cam member.

RALPH D. LACOE.